United States Patent
Franken

(10) Patent No.: US 8,907,637 B2
(45) Date of Patent: Dec. 9, 2014

(54) REACTIVE POWER COMPENSATOR HAVING A BOOSTER TRANSFORMER

(71) Applicants: ABB Technology AG, Zurich (CH); Marie Jansson, Vasteras (SE)

(72) Inventor: Bengt Franken, Vasteras (SE)

(73) Assignee: ABB Technology AG (CH)

( * ) Notice: Subject to any disclaimer, the term of this patent is extended or adjusted under 35 U.S.C. 154(b) by 0 days.

(21) Appl. No.: 13/907,303

(22) Filed: May 31, 2013

(65) Prior Publication Data

US 2013/0265014 A1   Oct. 10, 2013

Related U.S. Application Data

(63) Continuation of application No. PCT/EP2010/068592, filed on Dec. 1, 2010.

(51) Int. Cl.
*G05F 1/70* (2006.01)
*H02J 3/18* (2006.01)

(52) U.S. Cl.
CPC . *G05F 1/70* (2013.01); *Y02E 40/30* (2013.01); *H02J 3/1878* (2013.01); *Y02E 40/12* (2013.01); *H02J 3/1864* (2013.01); *H02J 3/1821* (2013.01)
USPC ............ 323/210; 323/208; 323/258; 323/343

(58) Field of Classification Search
USPC .................. 323/205, 207–211, 255, 258, 259
See application file for complete search history.

(56) References Cited

U.S. PATENT DOCUMENTS

| | | | | |
|---|---|---|---|---|
| 1,992,809 A | * | 2/1935 | Blume | 323/208 |
| 4,672,298 A | * | 6/1987 | Rohatyn | 323/208 |
| 5,367,197 A | * | 11/1994 | Klerfors | 307/105 |
| 5,905,367 A | * | 5/1999 | Hochgraf | 323/210 |
| 5,909,105 A | * | 6/1999 | Noroozian | 323/211 |
| 6,326,773 B1 | * | 12/2001 | Okuma et al. | 323/209 |
| 6,737,837 B1 | * | 5/2004 | Halvarsson et al. | 323/205 |

(Continued)

FOREIGN PATENT DOCUMENTS

| DE | 3045574 A1 | 7/1982 |
|---|---|---|
| EP | 1324459 A2 | 7/2003 |

(Continued)

OTHER PUBLICATIONS

Vidyasagar, et al.; "Co-Ordination of SVC and on Load Tap Changing Transformer for Reactive Power Control in Power Systems"; Proceedings of the International MultiConference of Engineers and Computer Scientists 2008 vol. II IMECS 2008, Mar. 19-21, 2008, Hong Kong; 6 pages.

(Continued)

*Primary Examiner* — Fred E Finch, III
(74) *Attorney, Agent, or Firm* — St. Onge Steward Johnston & Reens LLC

(57) ABSTRACT

A reactive power compensator. The reactive power compensator includes a power transformer having an AC bus side and a compensator bus side, wherein the power transformer is connectable to an AC grid at the AC bus side. The reactive power compensator further includes a thyristor-switched capacitor and a thyristor-controlled reactor connected to the compensator bus side. The reactive power compensator includes a booster transformer connected in series with the power transformer and to the compensator bus side. The invention also relates to computer programs and computer program products.

10 Claims, 6 Drawing Sheets

(56) References Cited

U.S. PATENT DOCUMENTS

| | | | |
|---|---|---|---|
| 7,920,392 B2* | 4/2011 | Schneider et al. | 363/37 |
| 2003/0122528 A1* | 7/2003 | Iyoda et al. | 323/207 |
| 2008/0265848 A1* | 10/2008 | Berggren et al. | 323/211 |
| 2009/0218993 A1* | 9/2009 | Berggren et al. | 323/205 |
| 2011/0304141 A1* | 12/2011 | Van Dyck et al. | 290/44 |

FOREIGN PATENT DOCUMENTS

| | | |
|---|---|---|
| JP | 2004266915 A | 9/2004 |
| JP | 2005269744 A | 9/2005 |
| JP | 2006166683 A | 6/2006 |
| JP | 2009065788 A | 3/2009 |
| WO | 2008126592 A1 | 10/2008 |

OTHER PUBLICATIONS

International Search Report and Written Opinion of the International Searching Authority Application No. PCT/EP2010/068592 Completed: Jan. 26, 2012; Mailing Date: Feb. 3, 2013 7 pages.

Abdel-Rahman, et al.; "New Static Var Compensator Control Strategy and Coordination With Under-Load Tap Changer"; IEEE Transactions on Power Delivery, vol. 21, No. 3, Jul. 2006; 6 pages.

* cited by examiner

REACTIVE POWER COMPENSATOR HAVING A BOOSTER TRANSFORMER

FIELD OF THE INVENTION

The present invention relates generally to the field of reactive power compensation in power systems, and in particular to static VAr compensators (SVC) for such systems.

BACKGROUND OF THE INVENTION

Reactive power control can be used for optimizing reactive power flow within an electric power system. A Static VAR (Volt-Ampere Reactive) Compensator (SVC) is an arrangement frequently used within such power systems for handling disturbances within the power system by means of reactive power. The SVC counteracts voltage drops in the power system by providing reactive power and is often able to handle overvoltages by absorbing reactive power. In short, the SVC is used for maintaining the voltage of the power system at a desired level by adjusting the reactive power flow.

To this end, the SVC typically comprises thyristor-switched capacitors (TSC) and thyristor-controlled inductive elements, also denoted reactors (TCR). These components of the SVC are controlled so as to provide the desired reactive power. In particular, if the power system's reactive demand is capacitive (leading), the SVC uses the reactors to consume VARs from the power system to which it is connected, thereby lowering the voltage of the power system. If the reactive power demand of the power system is inductive (lagging) the capacitors are used for supplying VARs to the power system, thereby increasing the power system voltage. The SVC further comprises a control system for controlling these functions.

FIG. 1 illustrates schematically a known SVC 1. The SVC 1 is connected to a power system 2, in the following denoted an AC grid 2, via a power transformer 3. The SVC 1 comprises a bank of thyristor-switched capacitors (TSC) 4, thyristor-controlled reactors (TCR) 5 and harmonic filters 6. The SVC 1 further comprises a control system 7 for regulating the reactive power input from the SVC 1 to the AC grid 2.

At dramatic voltage drops in the AC grid 2, the function of the SVC 1 deteriorates in that less reactive power can be output therefrom. This deteriorated performance of the SVC 1 stems from the impedance characteristics of the shunt connected TSC 4 and TCR 5 of the SVC 1. If neglecting voltage drops over the power transformer 3, this can be approximated by the following equation:

$$Q = B^* (\tau^* U)^2$$

where Q is the generated reactive power of the TSC on a secondary side of the power transformer 3, B is the admittance of the shunt capacitor of the TSC, U is the SVC controlled AC voltage in the AC grid bus on the primary side of the power transformer 3 and τ is the power transformer ratio.

τ is equal to 1.0 for the power transformer 3 of the SVC 1, and it can thus be seen that the reactive power output Q is related to the square of the AC voltage. The deteriorated performance of the SVC 1 at large voltage drops, mentioned earlier, can thus easily be realized. As the SVC reactive power output Q approaches its rated values, the SVC looses active control.

Today, to the extent that the above described shortcoming is at all addressed, the SVC would most likely be overrated. In particular, additional TSC steps could be introduced. However, overrating power system components is in general a most inefficient solution as such components often are expensive.

From the above, it is clear that there is a need for an improvement on this situation in this field of technology.

SUMMARY OF THE INVENTION

It is an object of the present invention to provide means and methods for overcoming, or alleviating, at least the above mentioned shortcomings of the prior art. In particular, it is an object of the invention to provide means and methods for enabling efficient support of power system voltage without the use of an expensive overrating solution.

This object, among others, is achieved by a reactive power compensator and by a computer program for controlling a reactive power compensator.

In accordance with the invention a reactive power compensator is provided. The reactive power compensator comprises a power transformer having an AC bus side and a compensator bus side, wherein the power transformer is connectable to an AC grid at the AC bus side. The reactive power compensator further comprises a thyristor-switched capacitor and a thyristor-controlled reactor connected to the compensator bus side. The reactive power compensator comprises a booster transformer connected in series with the power transformer and to the compensator bus side.

In accordance with the invention, a booster transformer is thus introduced in the reactive power compensator. The present invention provides a most flexible solution, e.g. in that the booster transformer may replace one or more additional TSC branches that would otherwise be needed when designing the power system. The number of components required may be reduced, as well as the required area in a switchyard. Further, a common control system is used for controlling all parts of the reactive power compensator. The control of the booster transformer is fast, providing a fast response on reactive power demands of the power system. Further yet, the invention may be implemented in existing power solutions with only a few modifications if any at all.

In accordance with an embodiment of the invention, the booster transformer comprises a single step tap changer. Having a single step tap changer provides a fast control thereof, having to pay no consideration to the speed at which successive tap changes can be performed.

In accordance with another embodiment of the invention, it further comprises power electronics connected to the booster transformer and arranged to prevent overvoltages. In accordance with a particular embodiment, the power electronics comprise IGBT components, varistors, diodes and/or resistors. Conventional components may thus be used for controlling the booster transformer and the reactive power compensator.

In accordance with another embodiment of the invention, the booster transformer comprises an on-line tap changer. A conventional component, available on the market may thus be used.

In accordance with another embodiment of the invention, the reactive power compensator further comprises a control system arranged to control the booster transformer as well as the thyristor-switched capacitor and the thyristor-controlled reactor. The use of a single control system for controlling all parts of the reactive power compensator provides a cost-efficient solution.

The invention also encompasses computer programs for controlling a reactive power compensator and to computer program products comprising such computer program. Advantages corresponding to the above are obtained.

Further features and advantages thereof will become clear upon reading the following description together with the accompanying drawings.

DETAILED DESCRIPTION OF THE INVENTION

Figure 1:
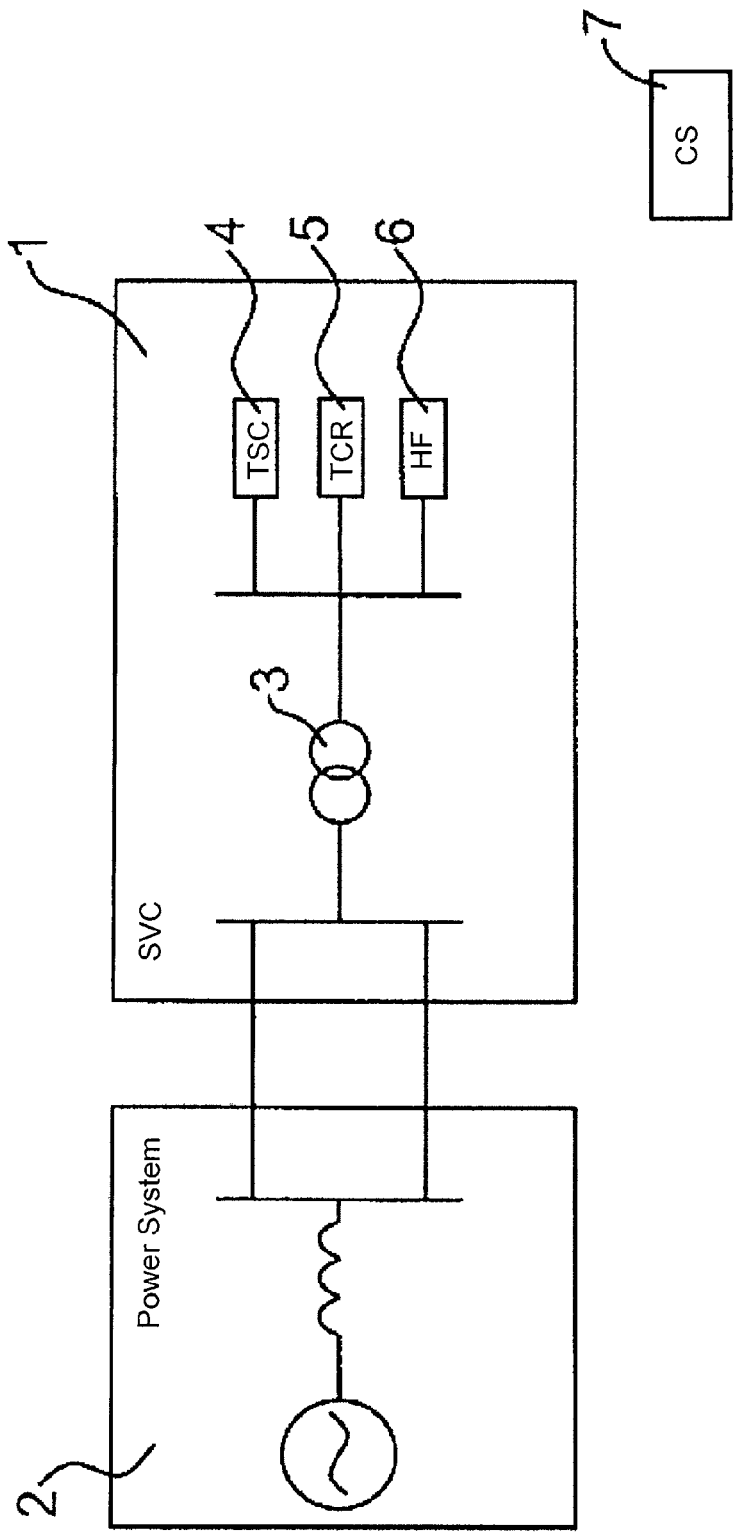
FIG. 1 illustrates schematically a prior art reactive power compensator.
Figure 2:
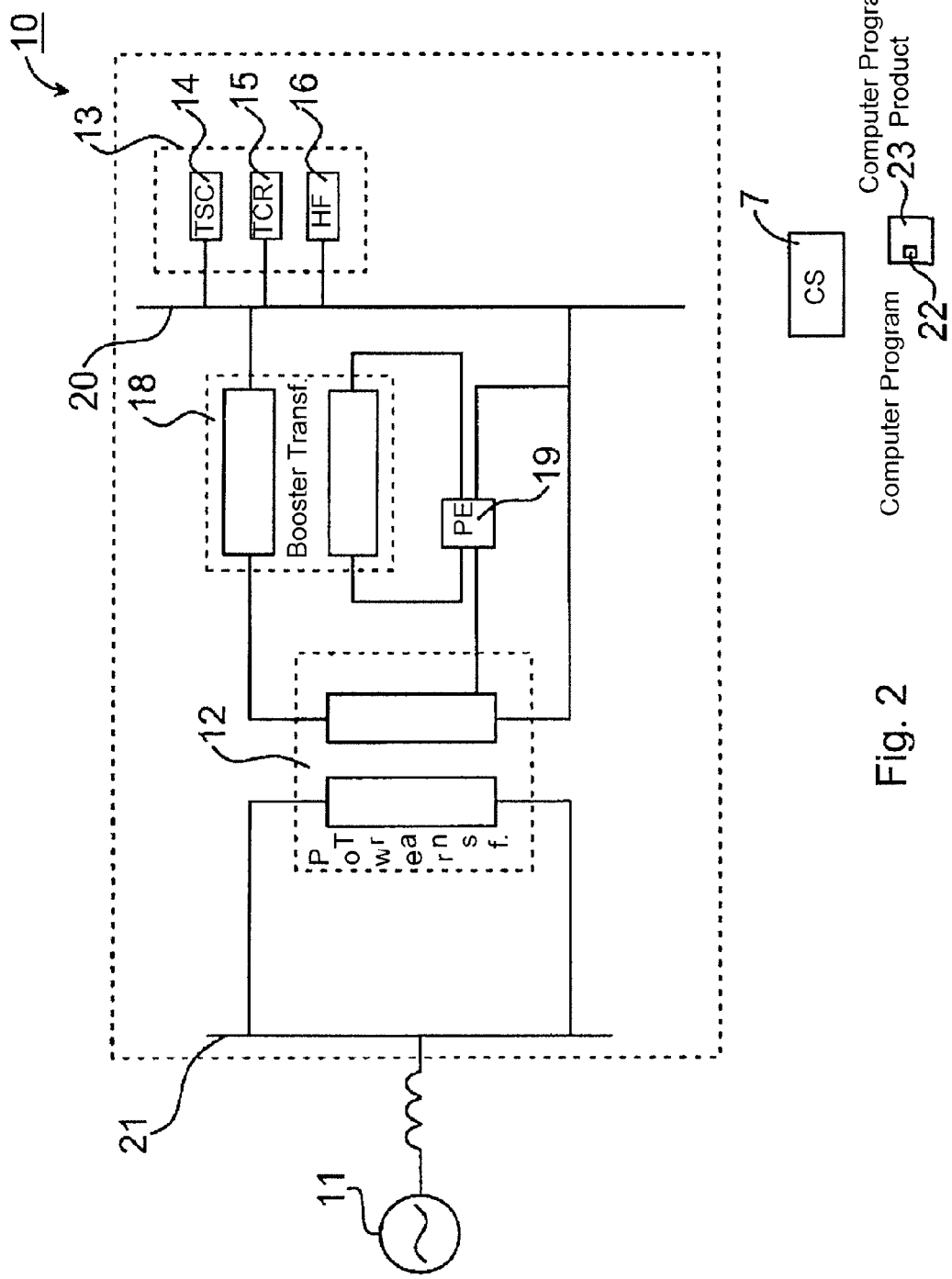
FIG. 2 illustrates schematically a reactive power compensator in accordance with an embodiment of the present invention.

FIG. 2 illustrates schematically a reactive power compensator in accordance with an embodiment of the present invention. The reactive power compensator is in the following exemplified by a static VAr compensator (SVC) 10.

The SVC 10 is, at its AC bus side 21, connected to an electric power system 11, for example an electricity distribution or transmission network, in the following denoted AC grid 11. The SVC 10 is connected to the AC grid 11 via a power transformer 12. The power transformer 12 can be considered to be a part of the SVC 10.

The SVC 10 comprises at its SVC bus side 20, sometimes also denoted SVC MV (medium voltage) bus side, a device 13 for providing variable inductive and capacitive power. The device 13 comprises conventional one or more thyristor-switched capacitors (TSC) 14, one or more thyristor-controlled reactors (TCR) 15 and one or more harmonic filters 16 and possibly further components conventionally used. Components available at the market may be used, and these will not be described in any further detail.

In accordance with the invention, the SVC 10 comprises a booster transformer 18 connected in series with the conventional power transformer 12. In particular, the booster transformer 18 is connected to the secondary winding of the power transformer 12 and to the SVC bus side 20.

The SVC 10 is controlled by a control system 17 for regulating the reactive power input to the power system 11. In accordance with the invention, the control system 17 is also used for controlling the booster transformer 1, and is described more in detail later.

Figure 3:
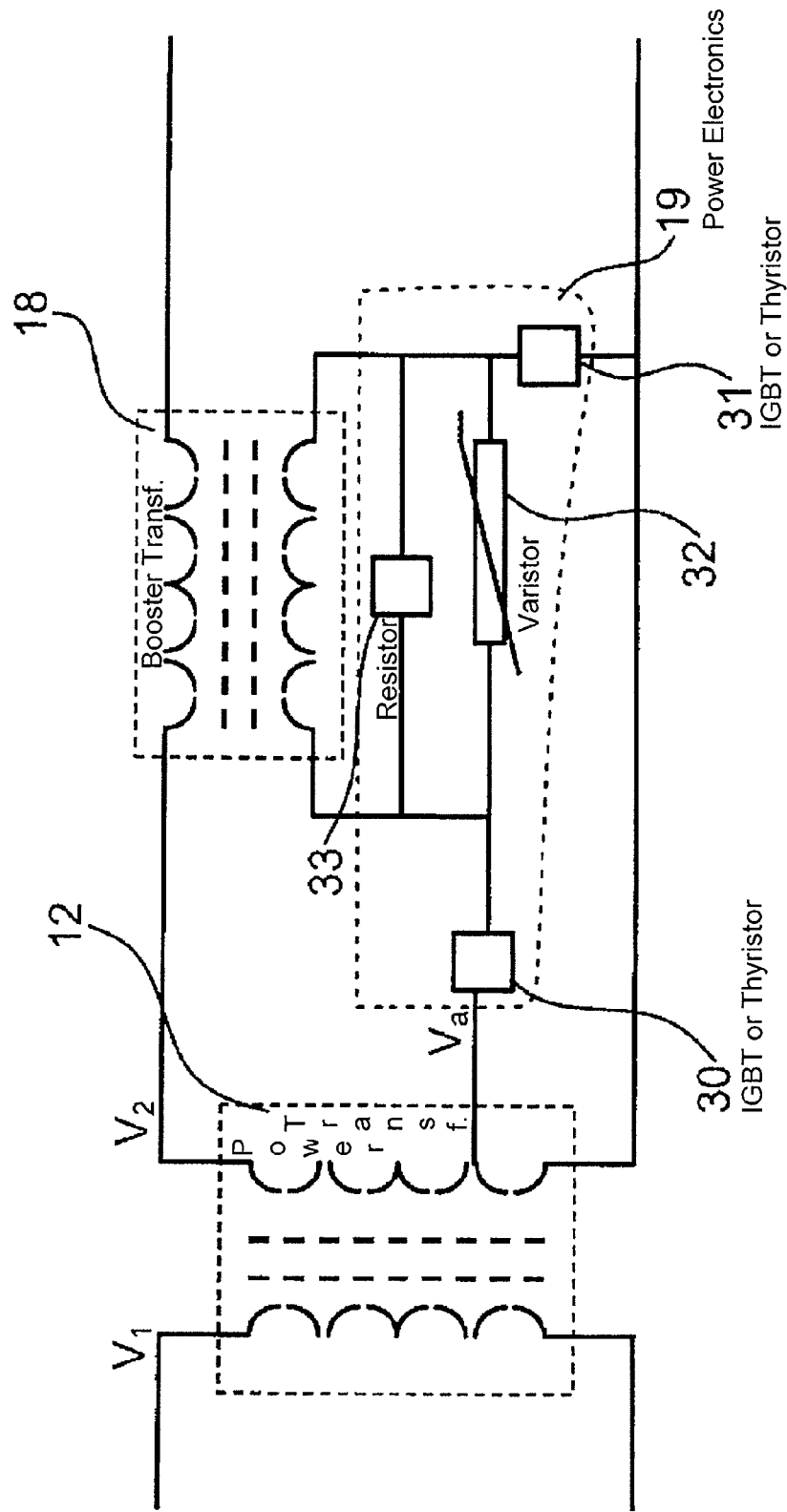
FIG. 3 illustrates the reactive power compensator of FIG. 2 in some more detail.

FIG. 3 illustrates the SVC 10 of FIG. 2 in some more detail and the same reference numerals are used for denoting same or corresponding parts. The primary voltage $V_1$ on the power transformer 12 primary winding AC grid side 21 is stepped down to an induced voltage $V_2$ on the power transformer secondary winding SVC bus side 20. The booster transformer 18 is connected in series with the power transformer 12 and tapped at a desired voltage $V_a$. As a particular, but non-limiting example, the voltage $V_a$ could be about 10% of the SVC 10 voltage $V_2$.

The booster transformer 18 is activated upon need and short-circuited when not in use.

The SVC 10 further comprises some power electronics 19 for preventing infinite voltages. The power electronics 19 comprises in an embodiment insulated gate bipolar transistor (IGBT) components, diodes, resistors and varistors arranged to prevent infinite voltages. The power electronics 19 are also arranged so as to enable the activation and deactivation of the booster transformer 18.

In the FIG. 3, a few exemplary components are illustrated. In particular, components having reference numerals 30, 31 may comprise IGBT units or thyristor units. The components 30, 31 are chosen to be suitable for activating and deactivating the booster transformer 18. A resistor 33 may be connected in parallel with the booster transformer 18, and also with a varistor 32, being for example a metal oxide varistor (MOV). The resistor 33 and/or varistor 32 are chosen and arranged so as to be able to limit and prevent infinite voltages.

The booster transformer 18 included in the SVC 10 preferably comprises a single step tap changer. It is conceivable to use more tap changer steps (not illustrated in the figures). However, consideration has to be paid to the speed at which successive tap changes can be performed. The booster transformer 18 is preferably fast and, as mentioned, with one or only a few tap ratio steps. A conventional on-line tap changer (OLTC) could be used, thus requiring a suitable on-load tap-changing mechanism. The OLTC is then realized as a separate booster transformer with power electronics as described earlier.

Further, the booster transformer 18 is preferably designed so as to increase the SVC 10 bus voltage, but the activation of the booster transformer 18 should preferably not increase the designing voltage range of the SVC bus. The SVC secondary bus voltage variation as the maximum ratio should be limited within this voltage range designed for without the tap step. Sudden AC voltage recovery is instead taken care of by the TCR step(s) 15.

The activation of the tap step is in an embodiment of the invention effectuated when the control system 17 goes into an Alert or an Emergency state, i.e. an abnormal situation occurs with low AC grid voltages. It is noted that hysteresis and time delays should be observed for proper utilization of the tap step at activation and deactivation of the tap step.

When the tap step is activated, a power oscillation damping (POD) function may be deactivated if such function is provided. The POD is deactivated since the SVC 10 operates at the limit of the range wherein a POD might not do any contribution to a possible power oscillation anyway.

The control system 17 comprises a computer program 22 (reference is made to FIG. 2) for controlling the booster transformer 18 of the SVC 10 as described, besides the conventional control of the thyristor-switched capacitors 14, thyristor-controlled reactors 15 and harmonic filters 16 comprised in the SVC 10. The computer program 22 comprises computer program code which when run on the control system 17 causes the control system 17 to activate the booster transformer 18 to thereby provide voltage support to the power system 11. The use of a single control system for controlling all parts of the SVC 10, as opposed to using two different control systems, i.e. a separate control system for controlling the booster transformer, provides a cost-efficient solution.

The activation of the booster transformer 18 enables enhanced provision of reactive power to the electric power system 11. The activation of the booster transformer 18 may be done based on different considerations. In an embodiment, mentioned earlier, the booster transformer 18 is activated when the control system 17 enters a particular mode of operation, e.g. Alert mode operation or Emergency mode operation. Such mode of operation may in turn be based on different criteria, e.g. when operating parameters of the SVC 10 are approaching their end points of the operating area for the SVC.

The invention also encompasses computer program product 23 (reference is again made to FIG. 2) comprising a computer program 22 as described above. The computer program product 23 further comprises a computer readable means on which the computer program 22 is stored.

The control system 17 comprises any suitable central processing unit (CPU), microcontroller, digital signal processor (DSP), etc., capable of executing software instructions stored in a computer program product 23 e.g. in the form of a memory. The computer program product 23 can be a memory or any combination of read and write memory (RAM) and read only memory (ROM). The memory also comprises persistent storage, which, for example, can be any single one or combination of magnetic memory, optical memory, or solid state memory or even remotely mounted memory. The computer program product 23 is in other embodiments an optical disc, such as a CD (compact disc) or a DVD (digital versatile disc) or a Blu-Ray disc.

Next, the invention is explained further by using a few examples, and remembering the equation introduced in the Background section:

$$Q=B*(\tau*U)^2$$

where Q is the generated reactive power of the TSC on a secondary side of the power transformer, B is the admittance of the shunt capacitor of the TSC, U is the SVC controlled AC voltage in the AC grid bus on the primary side of the power transformer and τ is the power transformer ratio.

Example illustrating improved reactive power output

Suppose the AC voltage of the AC grid 11 is falling to 90%=0.90 p.u. (per unit).

Today, this would give Q_max of the TSC:

$$Q=1.0*(1.0*0.9)^2=0.81 \text{ p.u.} ==81\% \text{ of nominal } Q.$$

In practice, this means that an SVC of +/−300 Mvar can "only" generate (by the TSC's) 243 Mvar when the AC voltage of the AC grid drops to 90%, which means that the voltage support from the SVC to the AC grid is substantially reduced.

Using the SVC in accordance with the invention would give Q_max of the TSC:

$$Q=1.0*(1.1*0.9)^2=0.99 \text{ p.u.} ==99\% \text{ of nominal } Q.$$

The SVC in accordance with the invention is able to generate 297 Mvar in the same situation, i.e. having a rating of +/−300 Mvar. The AC voltage support to the AC grid can be maintained.

In particular, the SVC in accordance with the invention gives 297−243=54 Mvar or 18% more reactive power to the AC grid compared to a known SVC.

There are some situations in which such voltage drop situations could occur. For instance, in load centers whereas the consumption of electrical power is growing and growing and the AC grids are not likely to be strengthened enough by building new transmission lines and therefore are operating closer to the transfer capability limits, such as thermal limits and stability limits. Sudden loss of a voltage supporting component, such as a generator, an SVC etc. in such situation would create voltage instabilities, causing the voltage to drop (probably quite slowly).

Steady-State Calculations

In the following and with reference to FIGS. 4-6 exemplifying system setups are presented comparing the prior art SVC 1 with the SVC 10 in accordance with the present invention.

First Setup

Figure 4:
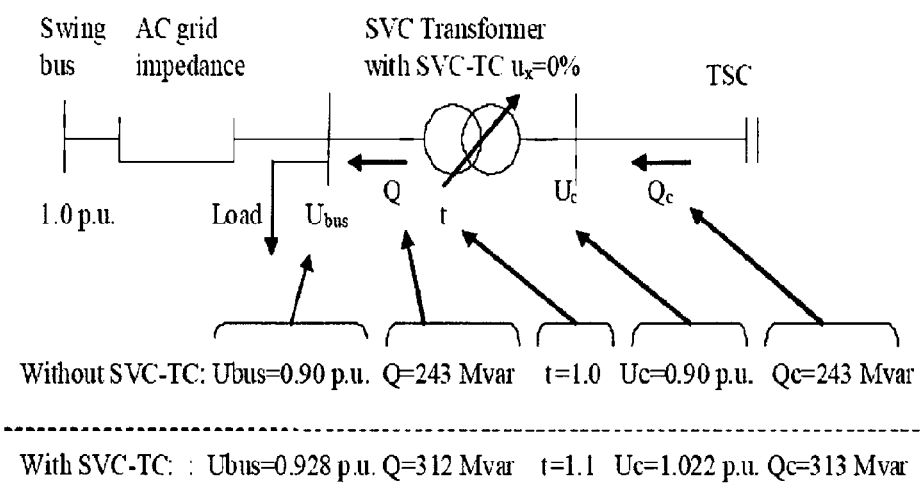
FIGS. 4-6 illustrate exemplifying system setups comparing prior art SVCs to the SVC in accordance with the present invention.

FIG. 4 illustrates a first system setup. In this example, the AC grid impedance represents a weak system and there is no short-circuit impedance in the SVC power transformer (as in the previous example).

With a conventional SVC 1, the following values are obtained: $U_{bus}$=0.90 p.u., Q=243 Mvar, τ=1.0, $U_c$=0.90 p.u., $Q_c$=243 Mvar.

In contrast, with the SVC 10 in accordance with the invention the following values are obtained: $U_{bus}$=0.928 p.u., Q=312 Mvar, τ=1.1, $U_c$=1.022 p.u., $Q_c$=313 Mvar.

The difference between prior art SVC and the present SVC having booster transformer (TC) can thus be seen to be $\Delta U_{bus}$=+0.029 p.u., i.e. +2.8% in the AC grid bus. Further, ΔQ is +69 Mvar, i.e. +23%, delivered to the AC grid with the inventive SVC. This is even higher than the previous example shown, as the grid voltage increases when more reactive power is delivered to the AC grid.

Second Setup

Figure 5:
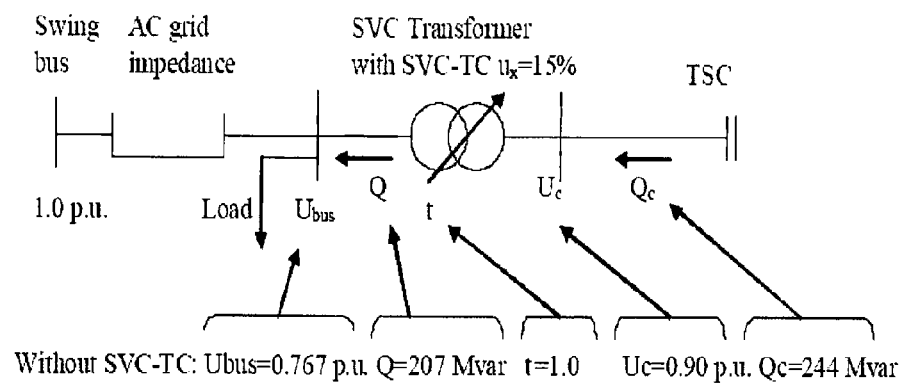

FIG. 5 illustrates a second system setup. In this example, the AC grid impedance represents a weak system and there is a short-circuit impedance in the SVC power transformer.

With a conventional SVC 1, the following values are obtained: $U_{bus}$=0.767 p.u., Q=207 Mvar, τ=1.0, $U_c$=0.90 p.u., $Q_c$=244 Mvar.

In contrast, with the SVC 10 in accordance with the invention the following values are obtained: $U_{bus}$=0.875 p.u., Q=340 Mvar, τ=1.1, $U_c$=1.176 p.u., $Q_c$=414 Mvar.

The difference between prior art SVC and the present SVC having booster transformer (TC) can thus be seen to be $\Delta U_{bus}$=+0.108 p.u., i.e. +10.8% in the AC grid bus. Further, ΔQ is +133 Mvar, i.e. +44%, delivered to the AC grid with the inventive SVC 10. This is even better performance than shown by the previous examples, due to the SVC power transformer short-circuit impedance creating a voltage magnitude difference when the capacitive current is going through the SVC power transformer.

Third Setup

Figure 6:
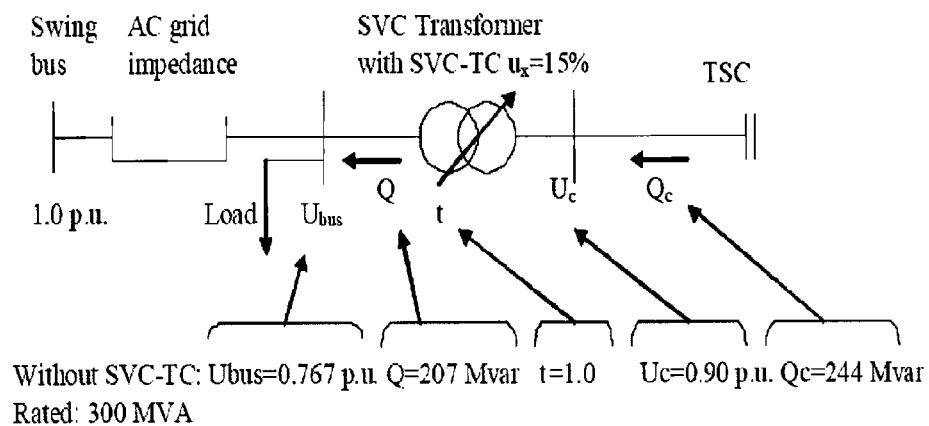

FIG. 6 illustrates a third system setup, being the same as for the second setup, but wherein the rating of the SVC in accordance with the invention is decreased. For further illustrating the improvements obtained by means of the present invention, the rating of the inventive SVC 10 is de-rated to the extent so that the delivered Mvars to the AC grid is about the same reactive power to the AC grid as for the prior art SVC. The prior art SVC has the same rating as in the second setup. Thus, also in this example, the AC grid impedance represents a weak system and there is a short-circuit impedance in the SVC power transformer.

With a conventional SVC 1, the following values are obtained: $U_{bus}$=0.767 p.u., Q=207 Mvar, τ=1.0, $U_c$=0.90 p.u., $Q_c$=244 Mvar. Rated: 300 MVA.

In contrast, with the SVC 10 in accordance with the invention the following values are obtained: $U_{bus}$=0.769 p.u., Q=209 Mvar, τ=1.1, $U_c$=1.034 p.u., $Q_c$=256 Mvar. Rated: 240 MVA.

The difference between prior art SVC and the present SVC having booster transformer (TC) can thus be seen to be $\Delta U_{bus}$=+0.0 p.u. in the AC grid bus. Further, ΔQ is +2 Mvar (same for both SVCS), delivered to the AC grid with the inventive SVC 10. It is thus shown that the SVC 10 in accordance with the invention can be de-rated from 300 MVA to 240 MVA if the same Mvars to the AC grid is considered.

From the above examples, it has been showed that the inventive SVC 10 provides more Mvar output at large voltage drops compared to the conventional SVC 1. If the conventional SVC 1 is over-rated in order to handle large voltage drops, a much higher rating is required for it, compared to the inventive SVC 10. The present SVC 10 provides a most flexible solution. For instance, a tap step may replace one or more additional TSC branches that would otherwise be needed when designing the power system. The number of components required may be reduced, as well as the required area in a switchyard.

What is claimed:

1. A reactive power compensator comprising a power transformer having an AC bus side and a compensator bus side, said power transformer being connectable to an AC grid at said AC bus side, said reactive power compensator further comprising a thyristor-switched capacitor and a thyristor-controlled reactor connected to said compensator bus side, the reactive power compensator being characterized by a booster transformer connected in series with said power transformer and to said compensator bus side; wherein said booster transformer is not active during a period of time before an operating parameter of the thyristor-switched capacitor and/or the thyristor-controlled reactor approaches an end point of its operating area, and said booster transformer is activated after an operating parameter of the thyristor-switched capacitor and/or the thyristor-controlled reactor approaches the end point of its operating area.

2. The reactive power compensator as claimed in claim 1, wherein said booster transformer comprises a single step tap changer.

3. The reactive power compensator as claimed in claim 1, further comprising power electronics connected to said booster transformer and arranged to prevent overvoltages.

4. The reactive power compensator as claimed in claim 3, wherein said power electronics comprises IGBT components, varistors, diodes and/or resistors.

5. The reactive power compensator as claimed in claim 1, said booster transformer comprising an on-line tap changer.

6. The reactive power compensator as claimed in claim 1, further comprising a control system arranged to control said booster transformer as well as said thyristor-switched capacitor and said thyristor-controlled reactor.

7. The reactive power compensator as claimed in claim 1, comprising a static VAr compensator.

8. A computer program stored on a non transitory computer readable medium for controlling a reactive power compensator as claimed in claim 1, said computer program comprising computer program code which when run on a control system controlling said reactive power compensator causes said control system to activate said booster transformer, thereby to provide voltage support.

9. The computer program as claimed in claim 8, wherein said booster transformer is activated upon said control system entering an alert operation mode or an emergency operation mode.

10. A computer program product comprising a computer program according to claim 8 and a non transitory computer readable medium on which said computer program is stored.

* * * * *